(12) United States Patent
Young

(10) Patent No.: US 9,211,761 B2
(45) Date of Patent: Dec. 15, 2015

(54) BRAKE DUST SEAL

(71) Applicant: John Edward Young, San Diego, CA (US)

(72) Inventor: John Edward Young, San Diego, CA (US)

( * ) Notice: Subject to any disclaimer, the term of this patent is extended or adjusted under 35 U.S.C. 154(b) by 194 days.

(21) Appl. No.: 14/040,950

(22) Filed: Sep. 30, 2013

(65) Prior Publication Data

US 2015/0091367 A1   Apr. 2, 2015

(51) Int. Cl.
*B60B 7/02* (2006.01)
*B60B 7/06* (2006.01)
*B60B 7/00* (2006.01)
*B60B 27/00* (2006.01)

(52) U.S. Cl.
CPC . *B60B 7/02* (2013.01); *B60B 7/066* (2013.01); *B60B 7/0066* (2013.01); *B60B 27/0047* (2013.01); *B60B 2900/141* (2013.01); *B60B 2900/5112* (2013.01)

(58) Field of Classification Search
CPC .............. B60B 7/00; B60B 7/16; B60B 7/01; B60B 7/02; B60B 7/066
USPC ....................... 301/37.105, 67.42, 37.101, 6.3
See application file for complete search history.

(56) References Cited

U.S. PATENT DOCUMENTS

| | | | | |
|---|---|---|---|---|
| 2,102,468 | A * | 12/1937 | Lyon | 301/37.105 |
| 2,198,944 | A * | 4/1940 | Mikkelson | 188/2 R |
| 3,397,918 | A * | 8/1968 | Aske, Jr. et al. | 301/37.42 |
| 3,724,905 | A * | 4/1973 | Kachler | 301/37.42 |
| 5,671,827 | A * | 9/1997 | Demetriou et al. | 188/71.6 |
| 6,796,406 | B1 * | 9/2004 | Yunes | 188/218 A |
| 8,292,044 | B2 * | 10/2012 | Simons et al. | 188/77 W |
| 9,010,882 | B2 * | 4/2015 | Romanov et al. | 301/37.105 |
| 2010/0236880 | A1 * | 9/2010 | Martinez | 188/218 A |

* cited by examiner

*Primary Examiner* — Hau Phan
(74) *Attorney, Agent, or Firm* — Plager Schack LLP

(57) ABSTRACT

A brake dust seal is configured to protect a wheel with a rim from brake dust coming from a brake proximate the wheel. The brake dust seal includes a solid panel covering a back of the wheel and connected to the wheel with a pliable seal that prevents the brake dust from getting to an outside of the rim.

6 Claims, 3 Drawing Sheets

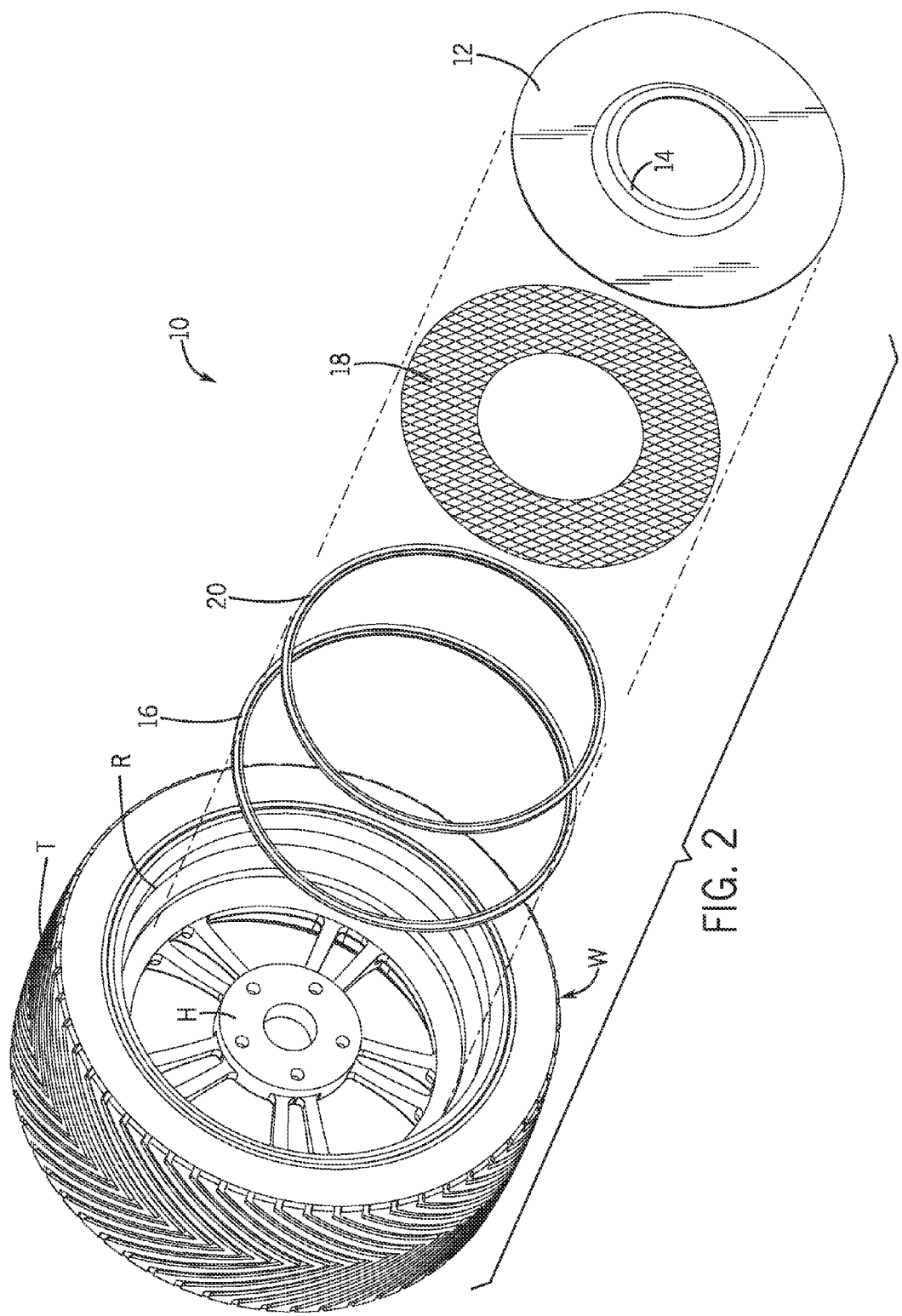

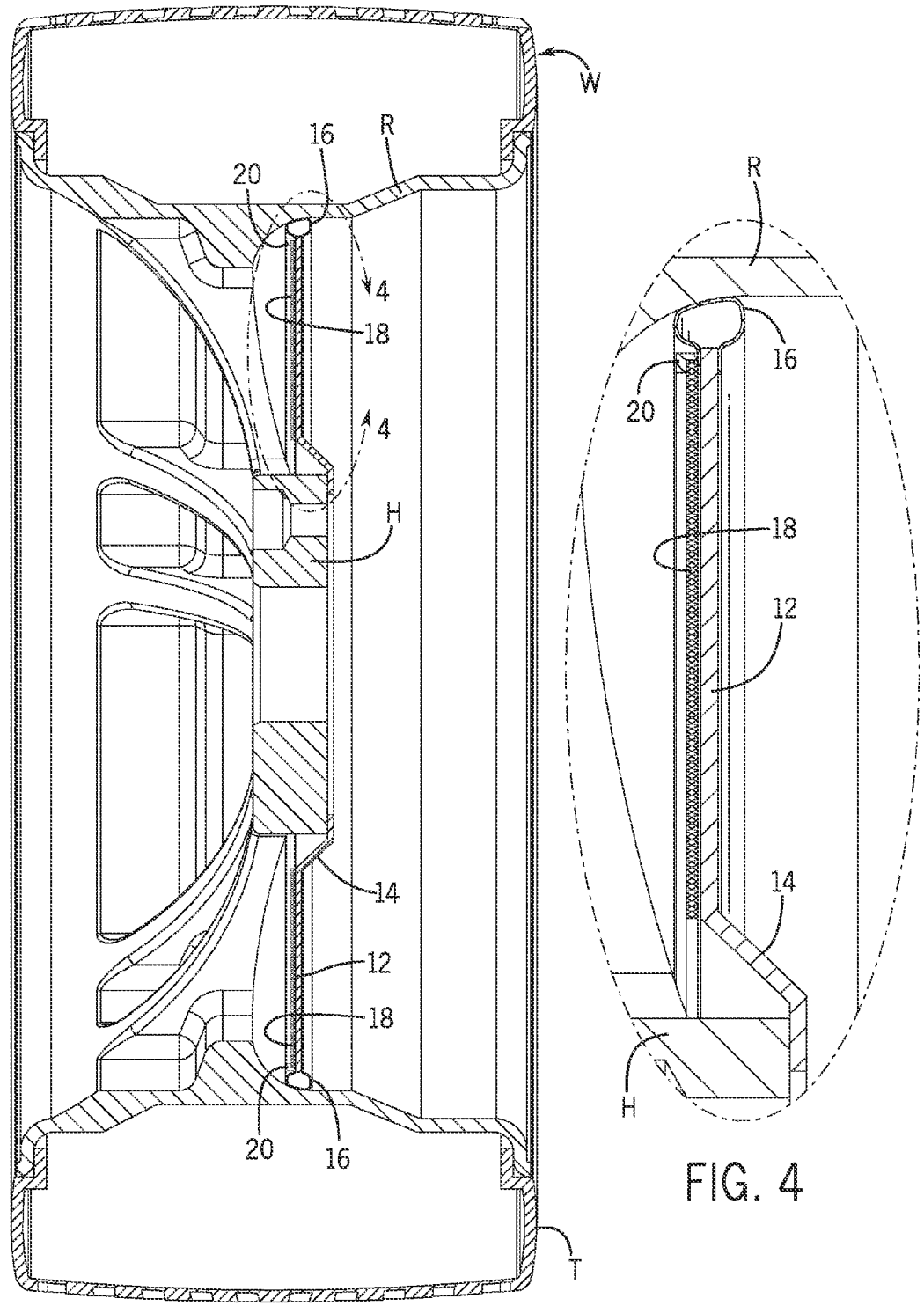

BRAKE DUST SEAL

BACKGROUND

The embodiments herein relate generally to automotive accessories. In particular, embodiments of the disclosed invention relate to devices that prevent brake dust away from an external surface on a tire rim.

A disc brake is a wheel brake which slows rotation of the wheel by the friction caused by pushing brake pads against a brake disc with a set of calipers. The brake disc is usually made of cast iron, but may be made of composites such as reinforced carbon-carbon or ceramic matrix composites. The brake disc is connected to the wheel and/or the axle. To stop the wheel, friction material in the form of brake pads, mounted on a device called a brake caliper, is forced mechanically, hydraulically, pneumatically or electromagnetically against both sides of the disc. Friction causes the disc and attached wheel to slow or stop.

When braking force is applied, the act of abrasive friction between the brake pad and the rotor wears both the rotor and pad away. The "brake dust" that is seen deposited on wheels, calipers and other braking system components consists mostly of rotor material. Brake dust can damage the finish of most wheels if not washed off. Generally, a brake pad that aggressively abrades more rotor material away, such as metallic pads, will create more brake dust. Another solution, to removing brake dust is the brake dust seal.

Prior to embodiments of the disclosed invention, prior art brake dust seals were flimsy and had vent or holes which permitted brake dust to be deposited on the rim surface of a wheel. This problem was further exacerbated by the lack of a firm seal on the brake dust seal. Embodiments of the disclosed invention solve these problems.

SUMMARY

A brake dust seal is configured to protect a wheel with a rim from brake dust coming from a brake proximate the wheel. The brake dust seal includes a solid panel covering a back of the wheel and connected to the wheel with a pliable seal that prevents the brake dust from getting to an outside of the rim.

In some embodiments, a mesh is joined to the pliable seal which is corrugated to provide cooling to the brake. A solid panel outer diameter is approximately equal to a rim inner diameter and a solid panel inner diameter is approximately three inches less than the solid panel outer diameter. The pliable seal can be firmly pinched in place by tightening lug nuts on the wheel.

BRIEF DESCRIPTION OF THE FIGURES

The detailed description of some embodiments of the invention is made below with reference to the accompanying figures, wherein like numerals represent corresponding parts of the figures.

FIG. 2 is an exploded perspective view.

FIG. 3 is a cross-sectional view taken on line 3-3 of FIG. 1.

FIG. 4 is an enlarged detail view indicated by line 4-4 of FIG. 3.

DETAILED DESCRIPTION OF CERTAIN EMBODIMENTS

Figure 1:
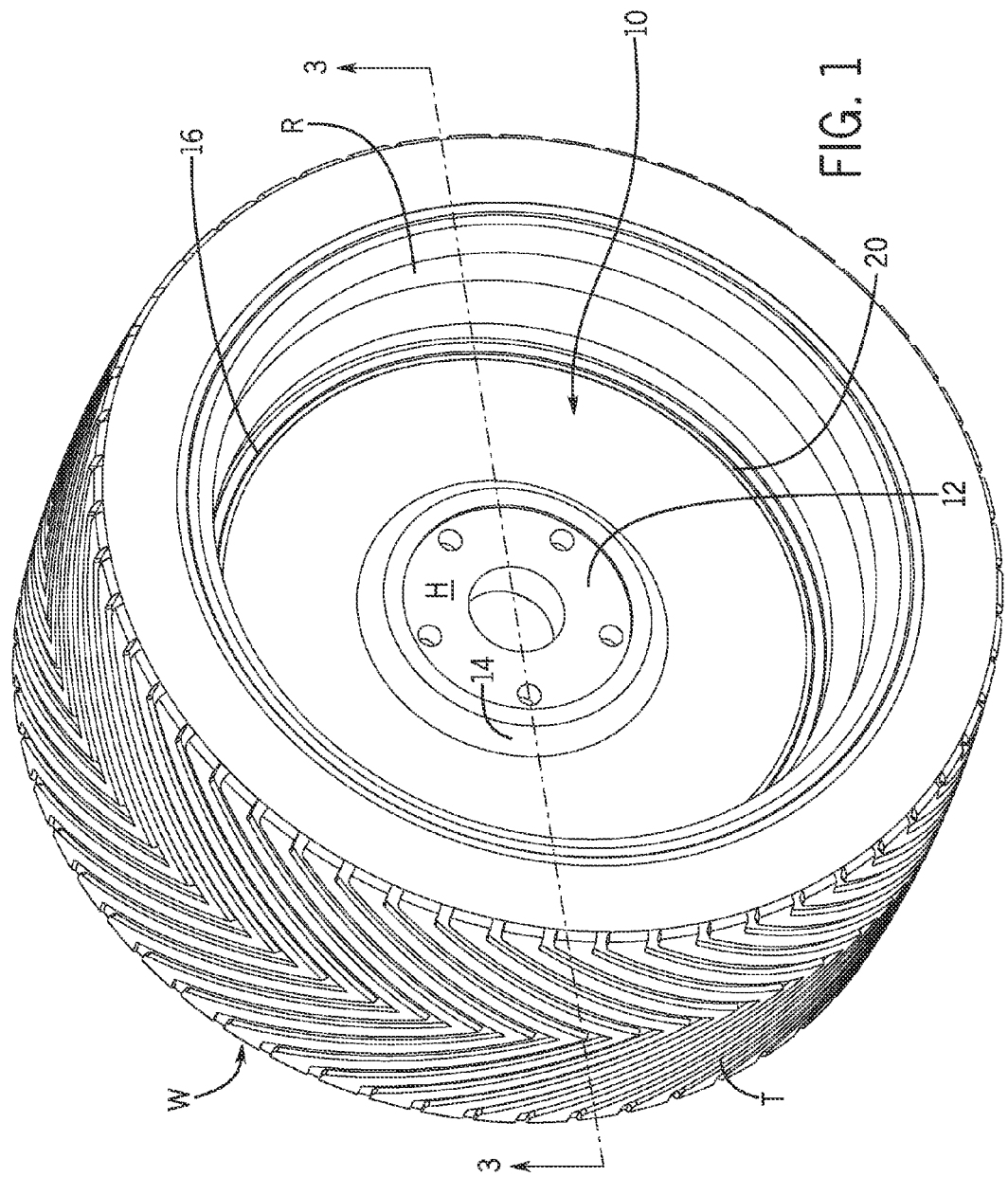
FIG. 1 is a perspective view of an embodiment of the invention in use.

By way of example, and referring to FIG. 1, brake dust seal 10 comprises solid panel 12. Solid panel 12 has a front side and a back side. The back side is mechanically coupled to raised panel 14. An outer diameter of solid panel 12 is mechanically coupled to corrugated covering 18 with pliable seal 16. Pliable seal 16 is surrounded by coupler 20 which is rigid and can fit into rim R.

As noted above, brake dust seals are attached to wheels. Here, wheel W comprises tire T mechanically coupled to rim R. Rim R further comprises hub H. Wheel W is mechanically coupled to a brake with lug nuts (not shown) as is well known in the art.

Turning to FIG. 2, raised panel 14 can fit over hub H and completely surround hub H. Raised panel 14 is designed to fit over any hub H that fits in any rim R between 17 inches and 27 inches in size on the market today. This is because coupler 20 will fit immediately adjacent to rim R and need not be touching spokes, if any, in rim R in a deviation from the prior art. This is distinguished as having a solid panel 12 with a pliable seal 16 as opposed to the prior art where the entire panel is pliable.

Turning to FIG. 3 and FIG. 4, corrugated covering 18 is joined with pliable seal 16 to cover solid panel 12. In some embodiments, corrugated covering 18 can be made from a metal mesh which permits cooling for the brake.

Solid panel 12 has a solid panel outer diameter and a solid panel inner diameter. Likewise, rim R has a rim inner diameter and a rim outer diameter. In some embodiments, the solid panel outer diameter is approximately equal to the rim inner diameter. The solid panel inner diameter is three inches less than the solid panel outer diameter. Pliable seal 16 is about one and one half inches in diameter. In some embodiments, solid panel 12 can be held in place by tightening lug nuts on wheel W.

While these components can be made of known materials in a known manner, the following materials have been shown to be effective. Solid panel 12 should be made from aluminum. Corrugated covering 18 can also be made from aluminum. Pliable seal 16 can be made from one half inch neoprene. In some embodiments, coupler 20 is a ¼ inch steal coupler.

Corrugated covering 18 can be used to dissipate heat from solid panel 12. However, corrugated covering 18 may not be used in all embodiments, when corrugated cover 18 is used it is held in place with pliable seal 16.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A brake dust seal configured for use with a wheel attached to a vehicle, the wheel being operably connected to a braking device and comprising a rim coupled thereto, the brake dust seal comprising:
a circular disk coupled to interior edges of the rim and comprising a cap coupled to a central portion of the circular disk, the circular disk being positioned such that the cap is disposed around a hub of the rim, wherein both the circular disk and cap seal any openings in the rim to prevent brake dust generated by the braking device from passing through the rim, thereby preventing the brake dust from flowing from an interior side of the wheel to an exterior side of the wheel.

2. The brake dust seal of claim 1, wherein the circular disk is coupled to the rim by a pliable seal.

3. The brake dust seal of claim 2, further comprising a corrugated covering layer coupled to the circular disk and positioned between the rim and the circular disk.

4. The brake dust seal of claim 3, wherein the corrugated covering layer is a mesh.

5. The brake dust seal of claim 4, wherein the circular disk comprises an outer diameter that is approximately equal to an inner diameter of the rim, and the circular disk comprises an inner diameter that is approximately three inches less than the outer diameter of the circular disk.

6. The brake dust seal of claim 5, wherein the pliable seal is firmly pinched in place by tightening lug nuts on the wheel.

* * * * *